United States Patent [19]

Coker

[11] Patent Number: 4,746,027
[45] Date of Patent: May 24, 1988

[54] REUSABLE SEALING CAP FOR BOTTLES

[76] Inventor: Chester C. Coker, P.O. Box 1676, McAllen, Tex. 78502

[21] Appl. No.: 42,739

[22] Filed: Apr. 27, 1987

[51] Int. Cl.$^4$ ............................................. B65D 45/16
[52] U.S. Cl. .................................................. 215/293
[58] Field of Search ............... 215/280, 284, 285, 286, 215/287, 290, 293, 359

[56] References Cited

U.S. PATENT DOCUMENTS

| | | | |
|---|---|---|---|
| 353,503 | 11/1886 | Rehfuss | 215/293 |
| 1,057,066 | 3/1913 | Langan | 215/293 |
| 1,433,383 | 10/1922 | Klostermann | 215/293 |
| 1,681,036 | 8/1928 | Groby | 215/293 |

Primary Examiner—Stephen Marcus
Assistant Examiner—Nova Stucker
Attorney, Agent, or Firm—Kenneth A. Roddy

[57] ABSTRACT

A reusable sealing cap for bottles of the type having a flat radially extending circular flange on the neck of the bottle spaced below the top edge of the mouth of the bottle. The reusable cap is removeably received on the open mouth of the bottle and partially surrounds the upper neck portion of the bottle. The cap member carries a resilient seal which fits over the open mouth of the bottle to sealably enclose the open mouth of the bottle. A movable spring wire lever member is pivotally mounted on the cap and bent in a configuration to form a flange engaging portion to be slidably received and biased beneath the circular flange in the sealing position and a pair of laterally opposed arcuate portions which create spring tension to create a compressive force between the cap and the circular flange sufficient to compress the resilient seal and effect a liquid tight seal on the open mouth of the bottle when the flange engaging portion is biased beneath the circular flange. The lever configuration includes a pair of smaller arcuate portions cooperative with the lateral arcuate portions to provide additional compressive force in the sealing position. The lateral arcuate portions also serve as a finger receiving handle for carrying the bottle.

10 Claims, 1 Drawing Sheet

4,746,027

REUSABLE SEALING CAP FOR BOTTLES

BACKGROUND OF THE INVENTION

1. Field of the Invention

This invention relates generally to the field of bottle caps and closures, and more particularly to a reusable sealing cap for bottles.

2. Brief Description of the Prior Art

Bottle capping devices are known in the art. There are several patents which disclose various wire form stoppers and liquid dispensing devices for installation on the mouth of a bottle or jar.

Chaille et al, U.S. Pat. No. 1,967,743 discloses a liquid dispensing device which has a single-piece clamping member comprising a swingable hook wire member bent in a semi-circular shape and the ends are pivotally mounted in the dispenser housing. The lower portion of the hook is a U-shape which engages the underside of the neck bead of the bottle. A flat seal is carried in the housing and seals on the top of the mouth of the bottle. There is very little spring action designed into the wire-form because the slightly protruding bead on which the wire bears allows minimal spring action sealing.

Rigby, U.S. Pat. No. 2,325,920 discloses a liquid dispensing device which has a single-piece clamping member comprising a wire bail with each arm bent in a gonerally S-shape and the ends are pivotally mounted in the dispenser housing. The lower portion of the bail is a flat semi-circular shape which engages the underside of the lip of the bottle. A beveled seal is carried in the housing and conforms to the interior mouth of the bottle. Also in this design the bead provides minimal wire bearing surface.

Brauner, U.S. Pat. No. 2,502,821 discloses another liquid dispensing device which has a two-piece, over-center clamping assembly comprising a U-shaped wire member with each arm bent and pivotally mounted in the dispenser housing, and a second wire member having a U-shaped portion which engages under the lip of the bottle. The ends of the second wire member are pivotally mounted on the bent arms of the first wire member. A seal member is provided in the housing which seals on the top of the bottle opening. Depressing the first member will draw the U-shaped portion of the second member inwardly and upwardly to engage the lip of the bottle. The first member carries the pivotal axis of the second member slightly past center so that the seal is maintained.

The patents of Chaille et al, Rigby, and Brauner are liquid dispensing devices which can be removed from the bottle. They are particularly constructed for use on old style cola bottles of the type which had a rounded decanting lip onto which a metal cap was pressed and on each of these the cap sealing mechanism applies tension to this rounded lip in the sealing of the bottle. The present invention, by way of contrast, seals by applying a spring tension against a flat radial collar found on state of the art bottles. These patents teach a pivot point above the mouth of the bottle, and the major portion of the housings are perched on the top of the bottle in such a way that two hands would be required to cap the bottles due to the limited stability of a high pivot point relative to the sealing surface. The present invention provides the pivot point below the mouth of the bottle and has the added convenience of being able to seal the bottle using just one hand.

Rigby (U.S. Pat. No. 2,325,920) and Chaille et al (U.S. Pat. No. 1,967,743) teach single bent-wire levers, however, there is very little spring tension designed into the wire-form because the slightly protruding rounded lip of the bottle does not provide a suitable bearing surface under which the lever may be biased. A strong spring tension wire lever would merely roll over the lip.

Tozer, U.S. Pat. No. 211,440 discloses a fruit jar stopper which has a clamping assembly comprising a U-shaped wire member with each arm bent in a loop and pivotally mounted in a recess in the bottom of the stopper, and a second wire member having a U-shaped portion which engages the top of a beveled stopper having a flat annular seal. The ends of the second wire member are pivotally mounted on the loop in the bent arms of the first wire member. Depressing the first member will draw the stopper and seal downwardly to seal the mouth and top of the bottle. The first member carries the pivotal axis of the second member slightly past center so that the seal is maintained.

De Quillfeldt, U.S. Pat. No. 610,721 discloses a bottle stopper which has an over-center clamping assembly comprising a U-shaped wire member with each arm bent in a loop and pivotally mounted on a wire neck band attached to the bottle neck beneath the bead, and a second wire member having a U-shaped portion which carries a beveled stopper. The ends of the second wire member are pivotally mounted on the loop in the bent arms of the first wire member. Depressing the first member will draw the stopper downwardly to seal the mouth of the bottle. The first member carries the pivotal axis of the second member slightly past center so that the seal is effectively maintained. This device is permanently attached to the bottle.

Crass, U.S. Pat. No. 1,481,505 discloses a bottle stopper which has an over-center clamping assembly comprising a U-shaped wire member with each arm bent in a loop and pivotally mounted in a recess in the bottle neck or bead, and a second wire member having a U-shaped portion which engages the top of a beveled stopper having a flat annular seal. The ends of the second wire member are pivotally mounted on the loop in the bent arms of the first wire member. Depressing the first member will draw the stopper and seal downwardly to seal the mouth and top of the bottle. The first member carries the pivotal axis of the second member slightly past center so that the seal is effectively maintained. This device is also permanently attached to the bottle.

The patents of Tozer, De Quillfeldt, and Crass teach non-reusable bottle stopper devices having the pivot points of the wire-form member used in attaching the cap more or less permanently secured to the bottles which does not allow for aftermarket application as does the present invention. These patents also have the disadvantage that the cap will tend to fall down over the mouth of the bottle as the contents are being poured and deflect the liquid flow from its intended receptacle.

The present invention is distinguished over the prior art, and these patents in particular by a reusable sealing cap for bottles of the type having a flat radially extending circular flange on the neck of the bottle spaced below the top edge of the mouth of the bottle. The reusable cap is removably received on the open mouth of the bottle and partially surrounds the upper neck portion of the bottle. The cap member carries a resilient seal which fits over the open mouth of the bottle to sealably enclose the open mouth of the bottle. A movable spring wire lever member is pivotally mounted on the cap and bent in a configuration to form a flange engaging portion to be slidably received and biased beneath the circular flange in the sealing position and a pair of laterally opposed arcuate portions which create spring tension to create a compressive force between the cap and the circular flange sufficient to compress the resilient seal and effect a liquid tight seal on the open mouth of the bottle when the flange engaging portion is biased beneath the circular flange. The lever configuration includes a pair of smaller arcuate portions cooperative with the lateral arcuate portions to provide additional compressive force in the sealing position. The lateral arcuate portions also serve as a finger receiving handle for carrying the bottle.

SUMMARY OF THE INVENTION

It is therefore an object of this invention to provide a reusable sealing device for bottles which is quickly and easily applied or removed from the mouth of a bottle.

It is another object of this invention to provide a reusable sealing device for bottles which provides a convenient carrying handle feature for lifting or carrying heavy liquid filled bottles.

It is another object of this invention to provide a reusable sealing device for bottles which allows the bottle to be sealed using only one hand and is actuated using hand movements which require less strength than the screw caps applied at the factory and is particularly useful for persons having low gripping strength or arthritis.

It is another object of this invention to provide a reusable sealing device for bottles which effects a long lasting sanitary seal by applying the seal to the top edge of the bottle mouth rather than to the inside of the bottle mouth where the seal may become contaminated by the bottle contents.

A further object of the invention is to provide a reusable sealing device for bottles having a relatively large circular top surface which may be used for logo display or promotional messages.

A still further object of the invention is to provide a reusable sealing device for bottles which is simple in design, aesthetically pleasing, economical to manufacture, and rugged and durable in use.

Other objects of the invention will become apparent from time to time throughout the specification and claims as hereinafter related.

The above noted objects and other objects of the invention are accomplished by a reusable sealing cap for bottles of the type having a flat radially extending circular flange on the neck of the bottle spaced below the top edge of the mouth of the bottle. The reusable cap is removably received on the open mouth of the bottle and partially surrounds the upper neck portion of the bottle. The cap member carries a resilient seal which fits over the open mouth of the bottle to sealably enclose the open mouth of the bottle. A movable spring wire lever member is pivotally mounted on the cap and bent in a configuration to form a flange engaging portion to be slidably received and biased beneath the circular flange in the sealing position and a pair of laterally opposed arcuate portions which create spring tension to create a compressive force between the cap and the circular flange sufficient to compress the resilient seal and effect a liquid tight seal on the open mouth of the bottle when the flange engaging portion is biased beneath the circular flange. The lever configuration includes a pair of smaller arcuate portions cooperative with the lateral arcuate portions to provide additional compressive force in the sealing position. The lateral arcuate portions also serve as a finger receiving handle for carrying the bottle.

DESCRIPTION OF THE PREFERRED EMBODIMENT

Figure 2:
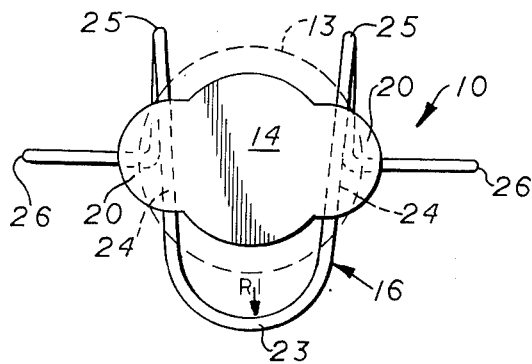
FIG. 2 is a top plan view of the reusable sealing device for bottles.

Referring now to the drawings by numerals of reference, there is shown a preferred reusable sealing device for bottles designated generally as 10. The illustrated portion of a bottle 11 may be considered to be representative of conventional bottles of the type employed for holding carbonated beverages. More specifically, the present invention is particularly suited for use with the larger and heavier 2 and 3 liter bottles of the type having a threaded neck 12 for threadedly and removably receiving a threaded "twist-off" cap, and a flat radially extending circular flange 13 spaced below the threaded neck. The flange 13 is used for handling the heavier bottles, and to some degree, preventing liquid from running down the side of the bottle during or after pouring the contents.

The device 10 comprises a cap member 14 which houses a resilient seal 15, and carries a single bent-wire retainer lever 16. The resilient seal 15 is a circular washer having a central internal diameter 17. The seal is retained on the underside of the cap member 14 by a depending conical protuberance having a circumferential shoulder 18 which is slightly greater than the internal diameter 17 of the seal 15. The seal may be removed and cleaned or replaced by snapping the seal in or out of engagement beneath the shoulder 18. It should be understood that the resilient seal 15 may also be secured to the underside of the cap member 14 by gluing, epoxy, or other conventional means, in which case the protuberance would be optional.

Figure 4:
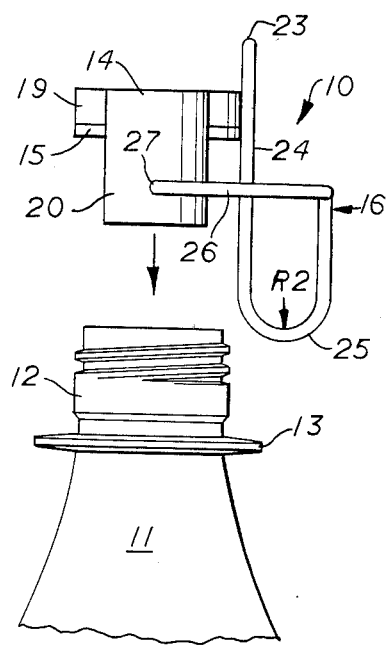
FIG. 4 is a side elevation view of the reusable sealing device being installed on a bottle.
Figure 3:
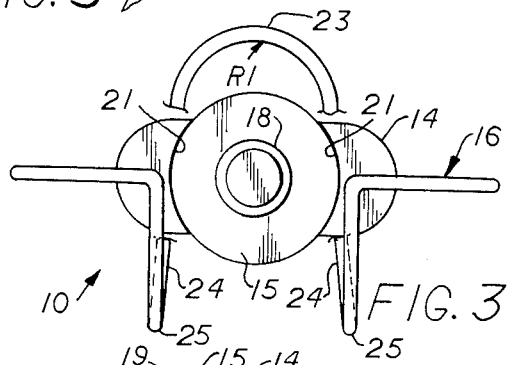
FIG. 3 is a bottom plan view of the reusable sealing device showing the underside.

The cap 14 is a generally cylindrical configuration having a flat top wall portion 19 with a pair of diametrically opposed, semi-cylindrical ear portions 20 which protrude laterally outward and extend longitudinally downward from the top wall portion 19. The arcuate interior surfaces 21 of the ear portions 20 define opposing segments of an internal diameter slightly greater than the outer diameter of the threads of the bottle neck 12. Also, the ear portions 20 are circumferentially spaced apart and each extends circumferentially a distance to partially surround a segment of the thread diameter sufficient to prevent the cap 14 from being installed or removed laterally from the threaded neck. In this manner, the cap 14 can only be installed and removed on the threaded neck 12 slidably and vertically, as shown in FIG. 4. Holes 22 extend radially inward from the periphery of each ear portion 20 to receive the free ends of the single wire lever 16.

In the following description of the bent-wire lever configuration, it should be understood that loops of other dimension may be used without departing from the scope of the invention. It should also be understood that loop dimensions may vary for application on either 2 liter or 3 liter bottles. The dimensions described herein have been found to produce satisfactory results on 2 liter bottles, and are used only as an example, and are not to be considered limiting.

The single bent-wire lever 16 is bent to form a central elongate U-shaped portion 23 running generally perpendicular to, and horizontally below the ear portions 20. The center of the U-shaped portion 23 is bent in an arc having a radius R1 of approximately 7/16" and the elongated leg portions 24 extend from the arc diverging outwardly sufficient to frictionally engage opposite sides of the lower neck portion of the bottle beneath the flange 13. The leg portions 24 are of such length to extend outwardly beyond the bottle flange 13 and each leg portion is bent downward to form a smaller U-shaped arc 25 having a radius R2 of approximately 3/16". The smaller arcs 25 are perpendicular to the larger arc 23. The lower legs of the U-shaped arcs 25 extend approximately one half the distance back toward the larger arc 23 and are bent to extend laterally outward at a point axially beneath the ear portions 20.

Figure 1:
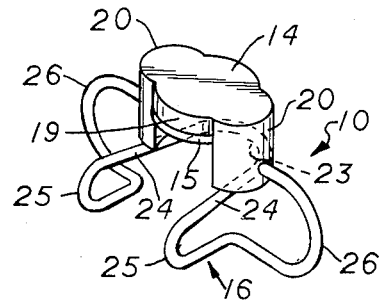
FIG. 1 is an isometric view of the reusable sealing device for bottles in accordance with the present invention.
Figure 6:
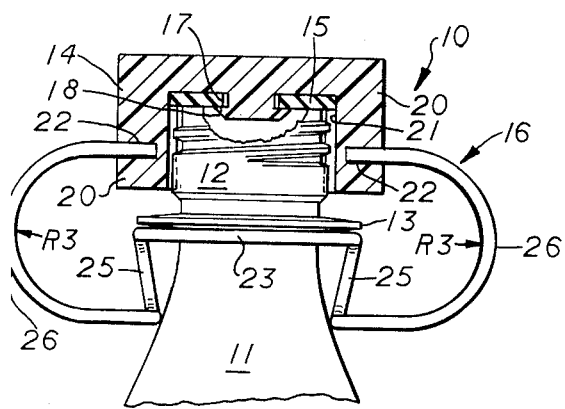
FIG. 6 is a longitudinal cross section of the reusable sealing device installed on a bottle.

As best seen in FIGS. 1 and 6, the laterally extending portion of the lower legs of the smaller arcs 25 are bent upward to form two opposed larger arcs 26 having a radius R3 of approximately 7/16". The larger arcs 26 are perpendicular to the smaller arcs 25 and the free ends curve upwardly and extend inwardly toward the ears 20 to be received in the holes 22. The holes 22 do not extend completely through the ear portions so that the ends of the wire will not catch on the bottle threads and interfere with the locking action of the seal.

The design of the lever 16 thus formed comprises two small 3/16" radius arcs 25 and three larger 7/16" radius arcs 23 and 25. The two larger arcs 26 are disposed vertically relative to the longitudinal axis of the cap upon sealing and the free ends form axially aligned pivot points 27 used in actuating the sealing of the device. The two smaller arcs 25 are disposed vertically relative to the longitudinal axis of the cap but are perpendicular to the two larger arcs 26. The third larger arc 23 is horizontally perpendicular to the other larger arcs 26. The function of the two vertical arcs 26 is to connect the bent-wire lever 16 to the cap 14 and to provide spring action to maintain a tight seal after the device is installed on the bottle. The function of the two smaller arcs 25 is to provide additional and stiffer spring action during sealing and to provide a rounded initial contact between the bottle flange 13 and the lever 16. Because the force applied against the flange 13 is both down and inward, the smaller arcs 25 guide and urge the elongate leg portion 24 of the lever 16 down and under the flange.

Once under the flange 13, the two vertical arcs 26 and the two vertical arcs 25 cooperate to provide spring tension to hold the cap 14 and the seal 15 against the top edge of the mouth of the bottle. Another important feature of the sealing action is that the horizontal arc 23 expands slightly during actuation of the seal and then contracts after sealing to provide better seating under the collar after actuation of the seal. This provides a very effective sealing action.

Figure 7:
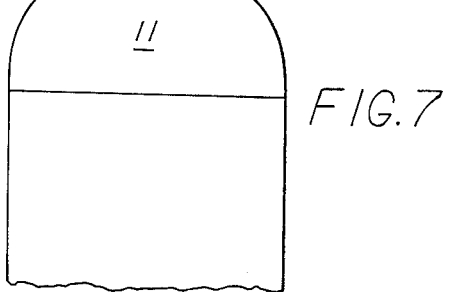
FIG. 7 is an elevation view, in reduced scale of the reusable sealing device installed on a bottle.

Another important utilitarian function of the two vertical arcs 26 is to provide a convenient handle by which the bottle can be carried after sealing. As represented in FIG. 7, carrying the bottle may be accomplished by placing the first and third fingers (F1 and F2) of either hand through the arcs 26 and carrying the bottle at your side.

By extending the ear portions 20 below the top edge of the mouth of the bottle and placing the lever attachment pivot point at the lower ends thereof, the height of the cap above the top of the bottle is relatively small. This makes it easier to place the sealed bottle upright in a refrigerator. Also, the concave interior of the ears 20 serves to center the cap 14 on the bottle when applying the seal.

OPERATION

Figure 5:
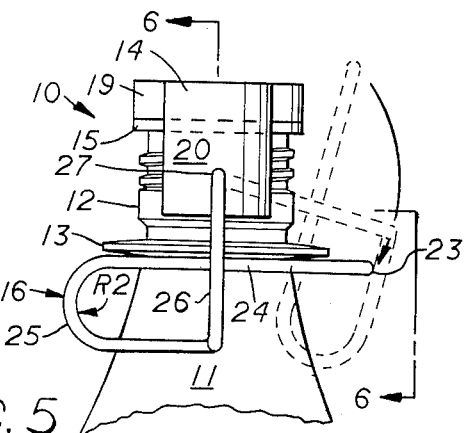
FIG. 5 is a side elevation view of the reusable sealing device installed on a bottle.

To install the cap 14, the user pivots the wire lever 16 upward to the raised position to the side of the cap as shown in FIGS. 4 and 5. The cap is then placed straight down onto the threaded neck 12 of the bottle. The user then presses downward on the arc 23. The two smaller arcs 25 provide a rounded initial contact between the underside of the bottle flange 13. As the loop 23 continues its arcuate path, the loops 25 are urged down and under the flange 13 until the elongate legs 24 snap into place. When the bent-wire lever 16 is properly positioned under the flange 13, the two arcs 26 expand slightly to provide spring tension between the flange 13 and the cap top wall 19 to compress the resilient seal 15 against the top edge of the mouth of the bottle. The two smaller arcs 25 provide additional spring tension to further hold the seal against the top edge of the mouth of the bottle. This double spring tension feature provides a very effective sealing action.

When properly installed, the lever 16 snaps in place assuring that a positive seal has been made. A screw cap on the other hand can, without the users awareness be tightened less than all the way, thereby allowing leakage and/or loss of carbonation.

Once the cap has been installed, the two vertical arcs 26 provide a convenient handle by which the bottle can be carried after sealing. Carrying the bottle may be accomplished by placing the first and third fingers of either hand through the loops and carrying the bottle at your side.

Because the present cap extends above the mouth of the bottle a minimum distance, the bottle with the cap installed can easily be placed upright in refrigerators which often have space limitations for standing 2 and 3 liter bottles.

Unsealing the bottle is accomplished by pushing upward on the arc 23, or by applying both thumbs against the two smaller arcs 25 and pushing against them. The latter method requiring very little effort to unseal the bottle.

The present cap is self-centering utilizing the exterior of the bottle neck and seals on the top edge of the mouth of the bottle, and thus provides a more sanitary closure than prior art devices that employ a seal which extends into the neck of the bottle. Seals which extend into the bottle may leave debris in the contents and can also pick up cola oils and residue over time and lose their ability to make an efficient seal. The ear portions of the present invention encompass minimal circumferential area of the threaded neck of the bottle, allowing air and light to circulate through the threads to reduce the likelihood of mold or bacteria building up on the threads.

The present cap is also quickly and easily installed or removed using hand movements requiring less strength, particularly in the wrist, than the screw caps applied at the factory. Also, since the motions used are large and arcing, then someone with low hand strength or arthritis can more easily use this device than a screw cap.

While this invention has been described fully and completely with special emphasis upon a preferred embodiment, it should be understood that within the scope of the appended claims the invention may be practiced otherwise than as specifically described herein.

I claim:

1. A reusable sealing cap for bottles of the type having a flat radially extending circular flange on the neck of the bottle spaced below the top edge of the mouth of the bottle comprising;
   a generally cylindrical inverted cup-shaped cap member having a flat top wall adapted to be removably received on the open mouth of the bottle and circumferentially spaced side portions depending therefrom which at least partially surround the upper neck portion of the bottle,
   a resilient seal carried in said cap member to sealably enclose the open mouth of the bottle, and
   a movable spring wire lever member pivotally mounted on said cap and bent in a configuration to form a flange engaging portion to be slidably received beneath the circular flange and a spring tension portion to create a compressive force between said cap and said circular flange sufficient to compress said resilient seal and effect a liquid tight seal on the open mouth of the bottle when the flange engaging portion is beneath the circular flange,
   said lever member pivotally movable between an unsealing position with the flange engaging portion spaced outwardly of the circular flange and a sealing position with the flange engaging portion spring biased against the underside of the circular flange.

2. A reusable sealing cap according to claim 1 in which
   said lever configuration includes a second spring tension portion cooperative with the first mentioned spring tension portion to provide additional compressive force between said cap and said circular flange when the flange engaging portion is beneath the flange.

3. A reusable sealing cap according to claim 1 in which
   said lever configuration includes a handle portion capable of receiving one or more fingers of the users hand for carrying the bottle when the flange engaging portion is beneath the flange.

4. A reusable sealing cap according to claim 1 in which
   said lever configuration includes
   a second spring tension portion cooperative with the first mentioned spring tension portion to provide additional compressive force between said cap and said circular flange when the flange engaging portion is beneath the flange, and
   a handle portion capable of receiving one or more fingers of the user's hand for carrying the bottle when the flange engaging portion is beneath the flange.

5. A reusable sealing cap according to claim 1 in which
   said cap member is a generally cylindrical inverted cup-shaped configuration having a flat top wall portion and diametrically opposed, circumferentially spaced, side portions extending downward from the top wall portion.

6. A reusable sealing cap according to claim 5 in which
   said side portions having longitudinally extending arcuate interior surface defining opposing segments of an internal diameter slightly greater than the outer diameter of the neck portion over which they are received and of sufficient circumferential extent to partially surround a segment of the neck portion to prevent said cap from being installed or removed laterally from the neck portion on which it is received.

7. A reusable sealing cap according to claim 1 in which
   said single bent-wire lever comprises a length of spring wire bent to form
   a first central elongate U-shaped portion having its center bent in a first arc and the elongate leg portions thereof extending therefrom and diverging outward sufficient to frictionally engage opposite sides of the lower neck portion of the bottle beneath the circular flange and the leg portions being of such length to extend outwardly beyond the flange when engaged thereon,
   the outwardly extending portion of the legs bent downward to form a pair of second smaller U-shaped arcs perpendicular to the first arc and having a radius smaller than the first arc,
   the lower legs of the second U-shaped arcs extending approximately one half the distance back toward the first larger arc and then bent to extend laterally outward, and
   the laterally outward extending portions of the lower legs bent upwardly to form two opposed third larger arcs perpendicular to the second smaller arcs and having a radius larger than the second smaller arcs and the free ends of which are pivotally received in the cap member side wall to form axially opposed pivot points.

8. A reusable sealing cap according to claim 7 in which
   said lever in the sealing position is positioned such that the first large arc is horizontal relative to the longitudinal axis of the cap member, the two second smaller arcs are perpendicular to the third larger arcs and the two second and the two third larger arcs are vertical relative to the longitudinal axis of the cap member,
   said third larger arcs creating spring tension in said lever to create a compressive force between said cap and said circular flange sufficient to compress said resilient seal and effect a liquid tight seal on the open mouth of the bottle when the flange engaging portion is beneath the circular flange,
   said second smaller arcs creating spring tension in said lever cooperative with the tension created by the third larger arcs to provide additional compressive force between said cap and said circular flange when the flange engaging portion is beneath the flange.

9. A reusable sealing cap according to claim 7 in which the third larger arcs of said lever defining a handle portion each with each arc capable of receiving one or more fingers of the user's hand for carrying the bottle when the flange engaging portion is beneath the circular flange.

10. A reusable sealing cap according to claim 7 in which said lever in the sealing position is positioned such that the first large arc is horizontal relative to the longitudinal axis of the cap member, the two second smaller arcs are perpendicular to the third larger arcs and the two second and the two third larger arcs are vertical relative to the longitudinal axis of the cap member, said third larger arcs creating spring tension in said lever to create a compressive force between said cap and said circular flange sufficient to compress said resilient seal and effect a liquid tight seal on the open mouth of the bottle when the flange engaging portion is beneath the circular flange, said second smaller arcs creating spring tension in said lever cooperative with the tension created by the third larger arcs to provide additional compressive force between said cap and said circular flange when the flange engaging portion is beneath the flange, and the third larger arcs of said lever defining a handle portion with each arc capable of receiving one or more fingers of the user's hand for carrying the bottle when the flange engaging portion is beneath the circular flange.

\* \* \* \* \*